United States Patent Office 3,594,467
Patented July 20, 1971

---

3,594,467
LONG-LASTING TROCHE
George L. Christenson, Cincinnati, and Harold E. Huber, Goshen, Ohio, assignors to Richardson-Merrell Inc., New York, N.Y.
Filed Oct. 9, 1968, Ser. No. 766,291
Int. Cl. A61k 27/12
U.S. Cl. 424—19                    8 Claims

ABSTRACT OF THE DISCLOSURE

A compressed powder, long-lasting, troche containing 4% to 17% of carboxypolymethylene, 15% to 70% of sodium caseinate and from about 13% to 81% of a water-soluble pharmaceutically acceptable tabletting diluent.

---

This invention relates to long-lasting troches or pastilles. According to this invention, troches are prepared which provide a vehicle for various medicaments used in treating the oral cavity or for sublingual or transbuccal administration lasting for periods of one-half hour to eight hours or more, and preferably for at least one or two hours.

In attempts by the applicants to prepare a compressed long-lasting troche that would serve as a vehicle for medicaments, a number of different ingredients and techniques were tried. Various quantities of high viscosity gums such as carboxypolymethylene, which is also used in this invention, e.g., having a viscosity of at least 29,400 cps. determined with an 0.5% mucilage at 25° C. were tried. However, the troche was not esthetically acceptable in that the troche would "flake-off" in the mouth rather than dissolve uniformly. The applicants then tried using low viscosity gums. The resultant troches dissolved uniformly over a prolonged period; however, the saliva produced in the mouth was extremely viscous and adhesive to the point where some persons experienced a gagging response after five minutes or more. Various gum levels and viscosity grades were tried in an effort to overcome these objectionable facets. It was found that when the gum levels were reduced to avoid the gagging response the dissolution time dropped off markedly, whereas the high viscosity grades produced a troche which would "flake-off" when used in quantities sufficient to attain a long dissolution time.

Troches made with proteins such as sodium caseinate or other proteins also have a number of shortcomings. Thus, when the quantity of sodium caseinate is in excess of about 75%, the troches are difficult to formulate and are softer than desirable. Mixtures containing in excess of about 90% protein either would not compress or, if a tablet were able to be formed, it was extremely friable and would break apart with light pressure, e.g., less than 1 kg. hardness on a Pfizer hardness tester. Furthermore, sodium caseinate, without certain quantities of carboxypolymethylene or other ingredients which the applicants have found suitable, has a short dissolution time unless very high concentrations are used and further, the dissolution time could not be prolonged significantly even with such high concentrations. Thus a troche containing 68% of sodium caseinate plus the other ingredients of the troches of this invention but without the carboxypolymethylene, had a dissolution time of only 31 minutes.

The applicants' work has shown that variations of the gum concentration will increase or reduce total dissolution time of troches; however, those troches with a sufficiently long dissolution time do not exhibit acceptable esthetic properties and either "flake-off" during dissolution or provide an unacceptably viscous saliva that, in some persons, stimulated a gagging reflex. After further experimentation with numerous formulations, it was discovered that variation of the precent protein in the troche would also serve to extend or shorten total dissolution time. It was further discovered that small amounts of gum could be added to a protein troche formulation to further prolong total dissolution time without obtaining the undesirable properties noted with higher gum levels.

It has now been found that a troche containing sodium caseinate and carboxypolymethylene has a long-lasting dissolution time together with uniform dissolution without the objectionable features of the above discussed formulations. Experiments have shown that the addition of the carboxypolymethylene to various levels of sodium caseinate resulted in a two to three-fold increase in total dissolution time. The total dissolution time of the troches is related to the amount of sodium caseinate incorporated in the troche matrix. Generally, the dissolution time is dependent on the percentage of sodium caseinate in the troche, i.e., the dissolution time is longer when a larger percentage of sodium caseinate is in the troche. It was further found, however, that a relatively small amount of carboxypolymethylene synergistically increases the troche dissolution time by an amount greater than the sum of dissolution times for troches made with corresponding levels of the gum and no protein or protein and no gum. The hardness of such troches is within a desirable level and in excess of 4 kg. as measured on a Pfizer hardness tester.

The troches of this invention contain from about 4% to 17% of carboxypolymethylene and from about 15% to 70% of sodium caseinate and preferably from about 4% to 10% of carboxypolymethylene and about 30% to 70% of sodium caseinate. The remainder of the troche can be a conventional water-soluble tablet diluent or base. Additionally, minor quantities of conventional pharmaceutical tabletting excipients such as tablet lubricants, dyes and flavoring agents can be employed in the troche composition.

The compressed troches of this invention can be made by either wet or dry granulation methods maintained at 3% or less moisture. Heat or moisture labile compounds can thus be included in the formulations and handled in a manner to maintain the compounds' integrity. The bland powders used as the troche matrix are readily flavored with a wide variety of fragrances to meet the widely varying products needs.

The drugs or medicaments used in the troche are those which are useful in treating the oral cavity or which have utility by sublingual or transbuccal administration. The medicament can be in powdered form or it can be absorbed on the various powdered ingredients of the troche. Examples of drug substances that may be suited for use in these troches are as follows: thymol, cresols, guaiacol, creosote, eugenol, hexachlorophene, cetylpyridinium chloride, tetracyclines, nystatin, penicillins, amphotericin B, erythromycin, bacitracin, neomycin, tyrothricin, tripelenamine HCl, diphenhydramine HCl, doxylamine succinate, chlorpheniramine maleate, pyrrobutamine phosphate, dexchlorpheniramine maleate, triamcinolone acetonide, butacaine sulfate, dyclonine HCl, benzocaine, sodium fluoride, stannous fluoride, potassium peroxymonosulfate, and vitamin A. The quantity of medicament in the troche can vary over a wide range. Generally, the quantity of medicament will vary from about 0.05% to 15% of the troche and preferably from 0.2 to 5% thereof.

Troches or pastilles are also referred to as lozenges, and when cylindrical or rod shaped as bacillules. The shape of the troche may be varied according to the use intended. It may be in the form of a large round tablet, a square of the lozenge type, a ball such as the familiar candy "jawbreakers" or capsule shaped.

The medicament is admixed with the powdered ingredients prior to compression.

The tabletting diluent or base is preferably a water-soluble disaccharide or water-soluble hexahydric saturated aliphatic alcohol. Illustrative of suitable diluents there can be mentioned sucrose, lactose, maltose, isomaltose, trehalose, sorbitol, mannitol, mixtures of the foregoing, and the like. The preferred diluent is mannitol. Apart from the carboxypolymethylene and sodium caseinate, the remainder of the troche can be composed of the diluent, optionally with a small quantity of a tabletting lubricant, to facilitate compression of the ingredients into a troche. Thus, the quantity of diluent can vary from about 13% to 81% by weight of the troche and preferably from about 25% to 66% by weight of the troche. When the troche also contains pharmaceutical tabletting lubricants, the percentage of diluent is decreased in an amount equal to the lubricant, but preferably the quantity of diluent is not less than 13% and more preferably not less than 20% by weight of the troche.

The pharmaceutical tabletting lubricant is generally finely divided and screened through an 80 or 100 mesh (U.S. Series) screen. The amount of lubricant can very as is conventional in the art, from about 0.1% to 6% but usually from aout 0.4% to 4% by weight of the troche. Illustrative of suitable lubricants, there can be mentioned hydrogenated vegetable oil, stearic acid, magnesium stearate, calcium stearate, white mineral oil, talc, sodium benzoate, sodium chloride, and the like.

These troches can be made by either wet or dry granulation methods, depending on the lability of the ingredients. Thus, the ingredients at some stage of their processing are in a powdered or finely divided form as is conventional in the manufacture of tablets or troches by the wet or dry granulation methods. Such methods, together with various particle sizes of the ingredients or mixture thereof, are described in Remington's Pharmaceutical Sciences, 13th edition, pages 568–572 (1965). Troches made by both the wet or dry granulation methods gave approximately the same in vitro dissolution times. However, in general, troches made by wet granulation methods are harder and do not break as readily when dissolved in the mouth.

Carboxypolymethylene is a well known synthetic resin. It is a white, fluffy, acid powder composed of extremely high molecular weight carboxy vinyl polymers. It has a viscosity of not less than about 29,400 cps. determined with an 0.5% mucilage at 25° C. Illustrative of carboxypolymethylene is the product Carbopol 934, which is sold by B. F. Goodrich Company.

Sodium caseinate is also a well known material. Illustrative of sodium caseinate is the product Land O'Lakes Sodium Caseinate which contains about 90 or 91% protein on a dry basis. Quantities of sodium caseinate given herein refer to substantially pure sodium caseinate.

Unless otherwise described, percentages given herein are on a weight basis.

The following examples are illustrative of the invention.

EXAMPLE 1

| | 500 troches, gms. |
|---|---|
| (1) Carbopol 934 (5%) | 12.50 |
| (2) Sodium caseinate (70%) | 175.00 |
| (3) Mannitol | 53.87 |
| (4) Sodium fluoride | 1.13 |
| (5) Zinc stearate | 5.00 |
| (6) Flavor | 2.50 |

Direction.—Blend the Carbopol 934, sodium caseinate, mannitol, and sodium fluoride in a suitable mixer and add sufficient deionized water to make a wet granulation. Dry the granulation in an oven at 120° F. to between 2 and 6% moisture. Pass the dried granulation through a 12 or 14 mesh oscillator screen, add the flavor powder and zinc stearate lubricant. Compress the mixture into 500 mg. troches on a Stokes tabletting machine at approximately 4000 p.s.i. and with 7/16 inch flat beveled punches.

EXAMPLE 2

| | 500 troches, gms. |
|---|---|
| (1) Carbopol 934 (8½%) | 85.00 |
| (2) Sodium caseinate (34%) | 340.00 |
| (3) Mannitol | 496.40 |
| (4) Cetylpyridinium chloride | 2.50 |
| (5) Benzocaine | 0.75 |
| (6) Menthol | 0.35 |
| (7) Talc | 37.50 |
| (8) Carbowax 6000 | 37.50 |

Directions.—Blend the Carbopol 934, sodium caseinate, mannitol, cetylpyridinium chloride, benzocaine, menthol, 18.75 gm. of talc, and 18.75 gm. of Carbowax 6000. Compress the mixture into ¾ inch flat faced slugs at approximately 4000 p.s.i. on a Stokes tabletting machine. Grind the slugs through 12 or 14 mesh oscillator screen. Add the remaining talc and Carbowax 6000 to the granules and mix well. Compress the mixture into ¾ inch flat beveled troches at approximately 4000 p.s.i. and to weight 2 gm. each.

EXAMPLE 3

| | 500 troches, gms. |
|---|---|
| (1) Carbopol 934 (15%) | 150.00 |
| (2) Sodium casinate (15%) | 150.00 |
| (3) Mannitol | 677.00 |
| (4) Diperodon | 0.50 |
| (5) Magnesium stearate | 20.00 |
| (6) Flavor | 2.50 |

Directions.—Mix the Carbopol 934, sodium casinate, mannitol, diperodon, flavor powder, and 10 gm. of magnesium stearate. Compress the mixture into ¾ inch flat faced slugs at approximately 4000 p.s.i. on a Stokes tabletting machine. Grind the slugs through a 12 or 14 mesh oscillator screen. Add the remaining magnesium stearate to the granules and mix well. Compress the mixture into ¾ inch flat beveled troches at approximately 4000 p.s.i. and to weight 2 gm. each.

EXAMPLE 4

This example together with Table I shows the synergistic increase of dissolution time of troches containing carboxypolymethylene and sodium caseinate.

The troches used in these studies contained only the specified quantities of carboxypolymethylene, or sodium caseinate, or a mixture of carboxypolymethylene and sodium caseinate, with the remainder of the troche in each instance being composed of mannitol filler, 2% of magnesium stearate lubricant and a yellow dye. Troches were made with carboxypolymethylene without the sodium caseinate, as well as with sodium caseinate without the carboxypolymethylene in order to determine the influence of such ingredients on prolongation of troche dissolution. The same quantities and percents of carboxypolymethylene and sodium caseinate were then combined into troches and the resultant dissolution times noted. Dissolution times were determined with the National Formulary XII apparatus suggested for evaluation of long-lasting dosage forms, and described on page 15 of the Second Supplement thereof. The procedure, however, was modified in that deionized water was used as the dissolution fluid and the troches were allowed to remain in the same fluid until approximately 8 hours had elapsed, or the troche was dissolved. Total time in minutes was noted for a minimum of three troches and their average time recorded in Table I. The results of this experiment are shown in Table I. The numbers under the headings—Obs.(Observed) and Ant. (Anticipated)—are in minutes. The numbers in parentheses refer to the dissolution time of troches containing only the sodium caseinate or carboxypolymethylene, as indicated, together with the filler, dye, and lubricant.

TABLE I

| | Percent sodium caseinate | | | | | | |
|---|---|---|---|---|---|---|---|
| | 0 | 17 | | 34 | | 68 | |
| | Obs. | Obs. (16) | Ant.[1] | Obs. (22) | Ant.[1] | Obs. (31) | Ant.[1] |
| 17% carboxypolymethylene | (299) | 492 | 315 | 520+ | 321 | 520+ | 330 |
| 8.5% carboxypolymethylene | (115) | 390 | 131 | 320 | 137 | 480+ | 146 |
| 4% carboxypolymethylene | (48) | 95 | 64 | 228 | 70 | 288 | 79 |

[1] Ant. is the anticipated dissolution time, i.e., the sum of the observed dissolution times for troches containing sodium caseinate without carboxypolymethylene and troches containing carboxypolymethylene without sodium caseinate.

Preferred troches of this invention contain at least 85%, by weight, of carboxypolymethylene, sodium caseinate and the diluent and particularly at least 90% by weight of such ingredients.

What is claimed is:

1. A compressed powder troche consisting essentially of an effective amount of medicament useful in treating the oral cavity or for sublingual or transbuccal administration, admixed with and compressed, to at least 4 kg. hardness, with (a) from about 4 to 17% of carboxypolymethylene; (b) from about 15 to 70% of sodium caseinate; and (c) from about 13% to 81% of a water-soluble pharmaceutical tabletting diluent.

2. A troche of claim 1 consisting essentially of from 4 to 10% of carboxypolymethylene, from 30 to 70% of sodium caseinate, from about 0.1 to 6% of a pharmaceutically acceptable tabletting lubricant, and from about 20 to 66% of said diluent.

3. A troche of claim 1 wherein the tabletting diluent is mannitol.

4. A troche of claim 1 wherein the tabletting diluent is lactose.

5. A troche of claim 1 wherein the tabletting diluent is a pharmaceutically acceptable saturated aliphatic hexahydric alcohol or a monosaccharide or a disaccharide.

6. A troche of claim 1 wherein at least 85% of said troche is composed of said carboxypolymethylene, sodium caseinate and diluent.

7. A troche of claim 2 wherein at least 90% of said troche is composed of said carboxypolymethylene, sodium caseinate and diluent.

8. A troche of claim 1 containing from 0.05 to 15% of a medicament.

References Cited

UNITED STATES PATENTS

| 2,051,779 | 8/1936 | Koch | 106—38 |
|---|---|---|---|
| 2,348,761 | 5/1944 | Sturken | 18—48 |
| 2,895,880 | 7/1959 | Rosenthal | 424—359 |
| 3,065,143 | 11/1962 | Christenson et al. | 424—19 |
| 3,074,852 | 1/1963 | Mayron | 424—19 |
| 3,145,146 | 8/1964 | Lieberman et al. | 424—34 |
| 3,184,386 | 5/1965 | Stephenson | 424—21 |
| 3,200,039 | 8/1965 | Thompson | 424—14 |
| 3,341,415 | 9/1967 | Scott | 424—361X |
| 3,446,899 | 5/1969 | Cavalli et al. | 424—14X |
| 3,458,622 | 7/1969 | Hill | 424—19 |
| 3,459,850 | 8/1959 | Riva | 424—19X |

SHEP K. ROSE, Primary Examiner

U.S. Cl. X.R.

424—22, 359